(12) United States Patent
Knauft

(10) Patent No.: US 8,274,964 B2
(45) Date of Patent: Sep. 25, 2012

(54) ADAPTIVE ROUTING FOR PACKET-BASED CALLS USING A CIRCUIT-BASED CALL ROUTING INFRASTRUCTURE

(75) Inventor: James P. Knauft, Warrenville, IL (US)

(73) Assignee: Alcatel Lucent, Paris (FR)

( * ) Notice: Subject to any disclaimer, the term of this patent is extended or adjusted under 35 U.S.C. 154(b) by 1496 days.

(21) Appl. No.: 11/820,978

(22) Filed: Jun. 21, 2007

(65) Prior Publication Data
US 2008/0317003 A1 Dec. 25, 2008

(51) Int. Cl.
*H04L 12/66* (2006.01)
(52) U.S. Cl. ........ 370/352; 370/230; 370/235; 370/401; 370/328
(58) Field of Classification Search .......... 370/328–330, 370/349, 230, 231, 235, 389–392, 400, 401
See application file for complete search history.

(56) References Cited

U.S. PATENT DOCUMENTS

| | | | |
|---|---|---|---|
| 6,084,875 A * | 7/2000 | Forrest | 370/355 |
| 7,796,581 B1 * | 9/2010 | Rangarajan et al. | 370/352 |
| 7,864,752 B1 * | 1/2011 | Bennett et al. | 370/352 |
| 2003/0152210 A1 * | 8/2003 | Delaney et al. | 379/220.01 |
| 2003/0158967 A1 * | 8/2003 | Tripathi et al. | 709/245 |
| 2004/0198349 A1 * | 10/2004 | Chin | 455/432.1 |
| 2004/0266422 A1 * | 12/2004 | Hotze et al. | 455/423 |

FOREIGN PATENT DOCUMENTS
JP 2004200945 A * 7/2004

* cited by examiner

*Primary Examiner* — Bob Phunkulh
*Assistant Examiner* — Jenkey Van
(74) *Attorney, Agent, or Firm* — Carmen Patti Law Group, LLC

(57) ABSTRACT

A method in one example has: implementing an incoming voice call routing preference in a telecommunication system, routing bias settings for incoming packet calls and incoming circuit calls being set for any candidate trunk group lists as per desired call routing preferences; and selecting one of packet routing and a non-packet routing for call routing, the candidate trunk group lists for individual routing destinations being updated to indicate if packet voice technology is to be used for call delivery, wherein if packet voice technology is preferred, then a packet core access trunk group is added to a front of a respective trunk group list, and wherein if packet voice technology is to be used only if no circuit trunks are available, then packet core access trunk groups are added at an end of the list.

14 Claims, 3 Drawing Sheets

ADAPTIVE ROUTING FOR PACKET-BASED CALLS USING A CIRCUIT-BASED CALL ROUTING INFRASTRUCTURE

TECHNICAL FIELD

The invention relates generally to telecommunication systems, and more particularly to a integration of call routing over a packet core network in a cellular system infrastructure that had previously supported only circuit switching.

BACKGROUND

Cellular switching systems are adapting to utilize packet-based transport for support of voice calls. One application of packet-based transport is Transcoder Free Operation (TRFO) in which the cellular infrastructure equipment allows calls to be routed through the network in their native packetized form and avoids the transcoding step in which voice packets are converted into a Pulse Code Modulation (PCM) format.

Cellular switching systems have traditionally determined how calls are routed through digit analysis. The dialed digits are analyzed and the set of candidate trunk groups is derived using routing data provided by the service provider. However, this method has supported only routing to circuit trunks.

Therefore, there is a need for an improved method and system that utilizes packet-based transport for support of voice calls.

SUMMARY

One implementation encompasses an apparatus. This embodiment of the apparatus may comprise: a first plurality of cells operatively coupled to a first mobile switching center, and a second plurality of cells operatively coupled to a second mobile switching center; a first mobile terminal operatively coupled to one of the cells of the first plurality of cells; a second mobile terminal operatively coupled to one of the cells of the second plurality of cells; the first mobile switching center operatively coupleable to the second mobile switching center via at least one circuit trunk, and via at least one packet core network using packet core access trunks; and functionality for implementing an incoming voice call routing preference and selecting one of packet routing and a circuit routing for call routing. In addition, mobile terminal can connect to another mobile terminal that is operatively coupled to the same plurality of cells via at least one loop-around circuit trunk, and via at least one packet core network using packet core access trunks. A mobile terminal can also be operatively coupled to a party within the public switched telephone network via at least one circuit trunk, and via at least one packet core network using packet core access trunks.

Another implementation encompasses a method. This embodiment of the method may comprise: implementing an incoming voice call routing preference in a telecommunication system; and selecting one of packet routing and a non-packet routing for call routing.

DESCRIPTION OF THE DRAWINGS

The features of the embodiments of the present method and apparatus are set forth with particularity in the appended claims. These embodiments may best be understood by reference to the following description taken in conjunction with the accompanying drawings, in the several figures of which like reference numerals identify like elements, and in which:

DETAILED DESCRIPTION

Figure 1:
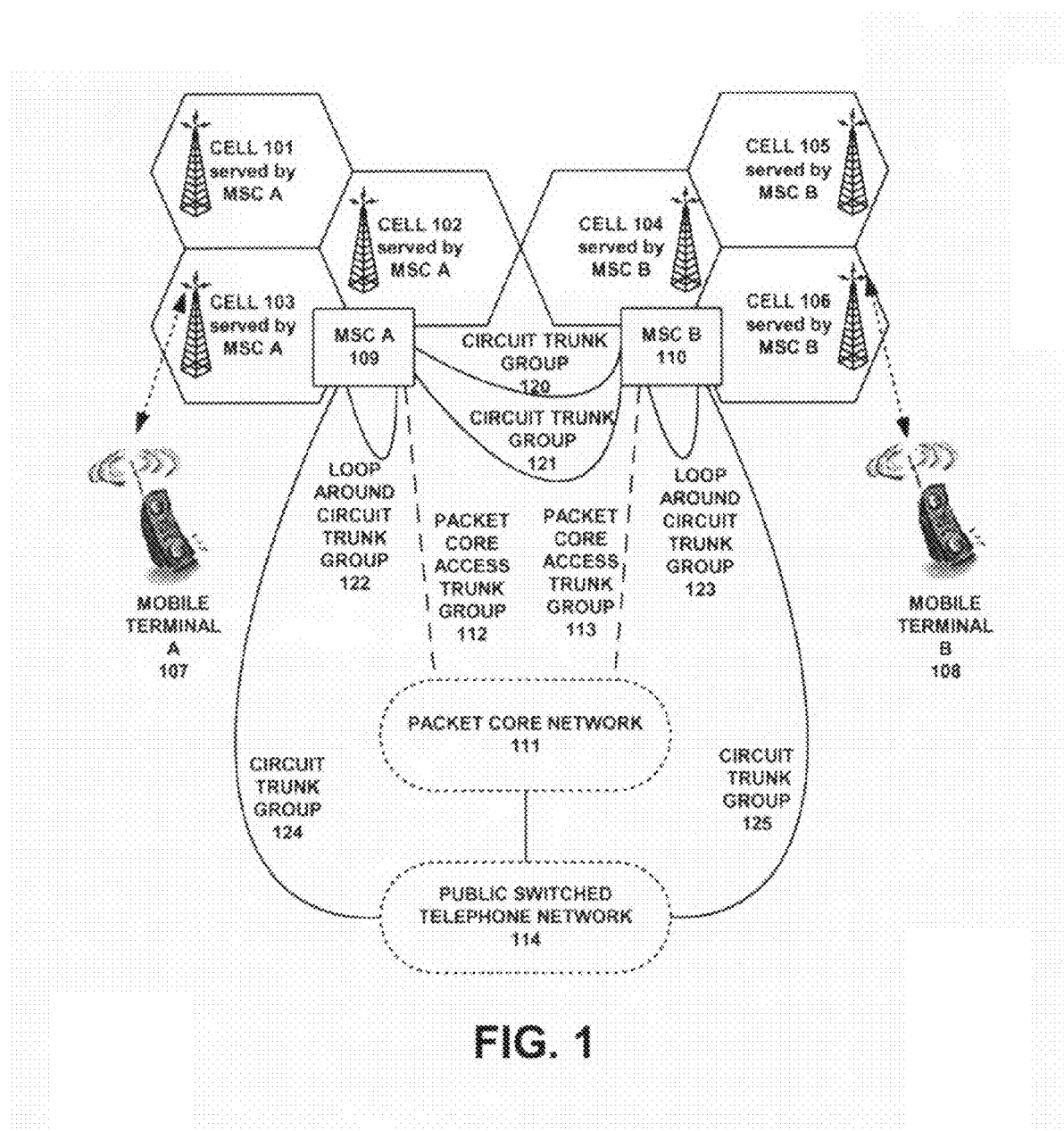
FIG. 1 depicts a packet core network in which is utilized embodiments according to the present method and apparatus.

The objective of the adaptive routing mechanism is to allow service providers to use existing call routing table databases to control how packet voice technology is utilized in their network while at the same time addressing any limitations for packet-mode voice call routing imposed by the cellular switching infrastructure.

Embodiments of the present method and apparatus allow service providers to use existing routing table structures to control routing of calls over the packet core network, The routing algorithms are modified to adapt to the following issues particular to routing packet-mode calls.

Restrictions may be present as to the call types that a mobile switching center can route as an outgoing packet-mode voice call. For example, an outgoing call may not be routed as a packet-mode call when certain service types are used (e.g., EVRC is supported, but 13K Voice service is not), when certain supplementary features are in use, or when switching system resources required for packet-mode voice calls are currently unavailable. Some of these restrictions may be eliminated as the support for packet-mode voice technology matures.

For incoming calls that are routed to another destination (i.e., trunk in, trunk out), service providers may wish to avoid multiple transitions between circuit-mode and packet-mode since the resulting voice quality may be degraded.

Embodiments according to the present method and apparatus provide an adaptive routing mechanism that provides an effective means for service providers to integrate call routing over a packet core network in a cellular system infrastructure that had previously supported only circuit switching. This solution allows service providers to control where packet voice technology is utilized within their switching network and addresses any limitations imposed by the use of packet voice technology.

Voice bearer paths are represented as trunk groups within the switching system's muting tables however these trunk groups are not associated with any physical hardware. They only represent bearer paths through the packet core network. This type of trunk groups is referred to as "Packet Core Access" trunks. Service providers can control how packet voice technology is employed to handle call traffic by including these packet voice trunk groups in their routing tables. By changing the relative priorities of candidate trunk groups for a destination, service providers can indicate a preference for using bearer paths over the packet core network or for using standard circuit trunks.

When an attempt to originate a call is made, the switching system infrastructure performs digit analysis on the called party number and obtains the list of candidate trunk groups from the routing tables as normal. However, if the candidate trunk group list includes a packet core access trunk, then the special processing for packet voice support will be performed. The cellular system infrastructure will first check if the current call instance is compatible with routing over the packet core network. If so, the cellular system infrastructure will then check if system resources for routing a call over the packet core network are currently available. If both of these checks pass, then the call may proceed as a packet voice call.

However, if either of these checks fail, then the packet core access trunks are removed from the candidate trunk group list and the call is routed using circuit trunks.

When an incoming call to a switch is routed to another destination (e.g., call forwarding), the cellular system infrastructure will again performs digit analysis on the called party number and obtain the list of candidate trunk groups from the routing tables. As before, if the candidate trunk group list includes a packet core access trunk, then the special processing for packet voice support will be performed. However, in this case, the special processing is dependent on the trunk type of the incoming call and the routing preferences specified by the service provider for the current trunk group list. If an incoming packet voice call is received and the service provider has indicated a preference for packet voice calls to be routed to the next destination as a packet voice call, then all packet core access trunks in the candidate trunk group list are moved to front of the list. If an incoming circuit voice call is received and the service provider has indicated a preference for circuit voice calls to be routed to the next destination as a circuit voice call, then all packet core access trunks in the candidate trunk group list are moved to end of the list.

The adaptive routing mechanism allows service providers to use one set of routing tables to control routing of calls over their circuit network and packet core network. The first part of the algorithm handles issues arising from any limitations regarding routing calls over the packet core network (e.g., call service type, call features used, system resource availability). The second part of the algorithm supports adjustment of call routing based upon the incoming call type (i.e., circuit or packet). The adaptive routing mechanism allows service providers to seamlessly blend the two network types together.

Thus, embodiments of the present method and apparatus may be considered as having two parts.

In a first part there is the situation where, given a traditional circuit based telephony system which performs digit analysis, another telephone network is introduced that is packet based. However, there is now a requirement that they interact with each other to do call routing in a way that bridges the two networks.

Embodiments of the present method and apparatus provide decision making regarding the use of traditional circuit based service or the use of a packet based network. Also, embodiments of the present method and apparatus allow the service provider to decide which method to use.

In the first part service provides are allowed to specify the method for call delivery. They may build off of their existing digit analysis and service plans.

The existing digit analysis mechanism used by a mobile switching system yields the trunk group list that has been provisioned for reaching a particular destination. By using virtual trunks for a particular destination and call path, a choice may be made to use, for example, only circuit, or packet with circuit as a backup, or circuit with packet as a backup.

In a second part, given the above described infrastructure that may represent a path in the packet core network as a virtual trunk group in a list of candidate trunk groups that all the existing digit analysis schemes may be utilized. For call forwarding, there may be a problem concerning the selection of either a packet core network or a circuit network since there may be more than one office involved in the path resulting in a series of hops to get to the final destination.

There is a desire to avoid switching technologies along the path. That is, if it starts out circuit, it should stay circuit; if it starts out packet, it should stay packet. Changing between packet and circuit may result in a loss of voice quality. Please note that this adjustment to call routing is optional and is controlled by provisioning performed by the service provider.

One particular situation is a case when there is a call coming in on a trunk and going out on a trunk, the incoming trunk type is examined and based on the provisioning that the service provider has set. The results of the routing may be biased based upon predetermined choices by moving the virtual trunks for packet voice over the packet core network either to the front of the list or to the end of the list. Thus, it is basically a pushing or pulling. Therefore, if it starts out circuit, it stays circuit; if it starts out packet, it stays packet. The exception is when the capacity of one type runs out. Then any remaining capacity of the other type may be used.

The trunk group list may be based on two inputs; the provisioning of the service provider, and the actual type of the incoming trunk which is detectable. The trunk group list may then be left as is, or the list may be reordered to bias the call routing to either circuit or packet.

Also, the settings for the trunk group list may be associated with the destination. For an incoming call, the call may be coming in on a trunk group, either real or packet core access.

Embodiments of the present method and apparatus may have the steps of: saving the trunk group type, proceeding with call processing and doing digit analysis which yields a trunk group list which has a non-sorted list of candidates in a particular order. But on that same trunk group list there is an opportunity for customers to indicate their preferences as to adjusting calls.

The candidate trunk group list may be only a portion of all trunk groups. The candidate trunk groups are those that the service provider has provisioned for use to a particular destination. For the case "If it starts out packet, it stays packet", this is accomplished by rearranging the candidate trunk list. This is accomplished by pulling the packet core access trunks to the front of the list. For the case, "if it starts out circuit, it stays circuit", this is accomplished by rearranging the candidate trunk list. This is accomplished by pushing the packet core access trunks to the end of the list.

FIG. 1 depicts a packet core network in which is utilized embodiments according to the present method and apparatus. In the example of FIG. 1 a plurality of cells 101, 102, 103 are operatively coupled to mobile switching center MSC A (109), and a plurality of cells 104, 105, 106 are operatively coupled to mobile switching center MSC B (110). A mobile terminal A (107) is operatively coupled to the cell 103, and a mobile terminal B (108) is operatively coupled to the cell 106. Mobile switching center MSC A (109) and mobile switching center MSC B (110) may be operatively coupled via circuit trunk groups 120, 121, and via packet core network 111, using packet core access trunk groups 112 and 113. Mobile-to-mobile calls on MSC A (109) may be operatively coupled via loop-around circuit trunk group 122, and via packet core network 111, using packet core access trunk group 112. Mobile-to-mobile calls on MSC B (110) may be operatively coupled via loop-around circuit trunk group 123, and via packet core network 111, using packet core access trunk group 113. Mobile-to-land calls on MSC A (109) may be operatively coupled to public switched telephone network (114) via circuit trunk group 124, and via packet core network 111, using packet core access trunk group 112. Mobile-to-land calls on MSC B (110) may be operatively coupled to public switched telephone network (114) via circuit trunk group 125, and via packet core network 111, using packet core access trunk group 113.

The following tables in conjunction with FIG. 1 describe selecting call delivery routes using a circuit network or a packet core network. The MSC A's 109 preferred method to deliver a call to mobile terminal B 108 is packet core network 111 and packet core access trunk 112. The MSC B's 110 preferred method to deliver a call to mobile terminal A is in the circuit network via circuit trunk 121.

TABLE A

Candidate trunk group list for call delivery from MSC A to MSC B

| Trunk Group | Priority | Type |
|---|---|---|
| 112 | 1 | Packet |
| 120 | 2 | ISUP |
| 121 | 3 | R1 |

TABLE B

Candidate trunk group list for call delivery from MSC B to MSC A

| Trunk Group | Priority | Type |
|---|---|---|
| 120 | 1 | ISUP |
| 121 | 2 | R1 |
| 113 | 3 | Packet |

In this example, ISUP and R1 are two existing network signaling types used in circuit telephone networks.

Figure 2:
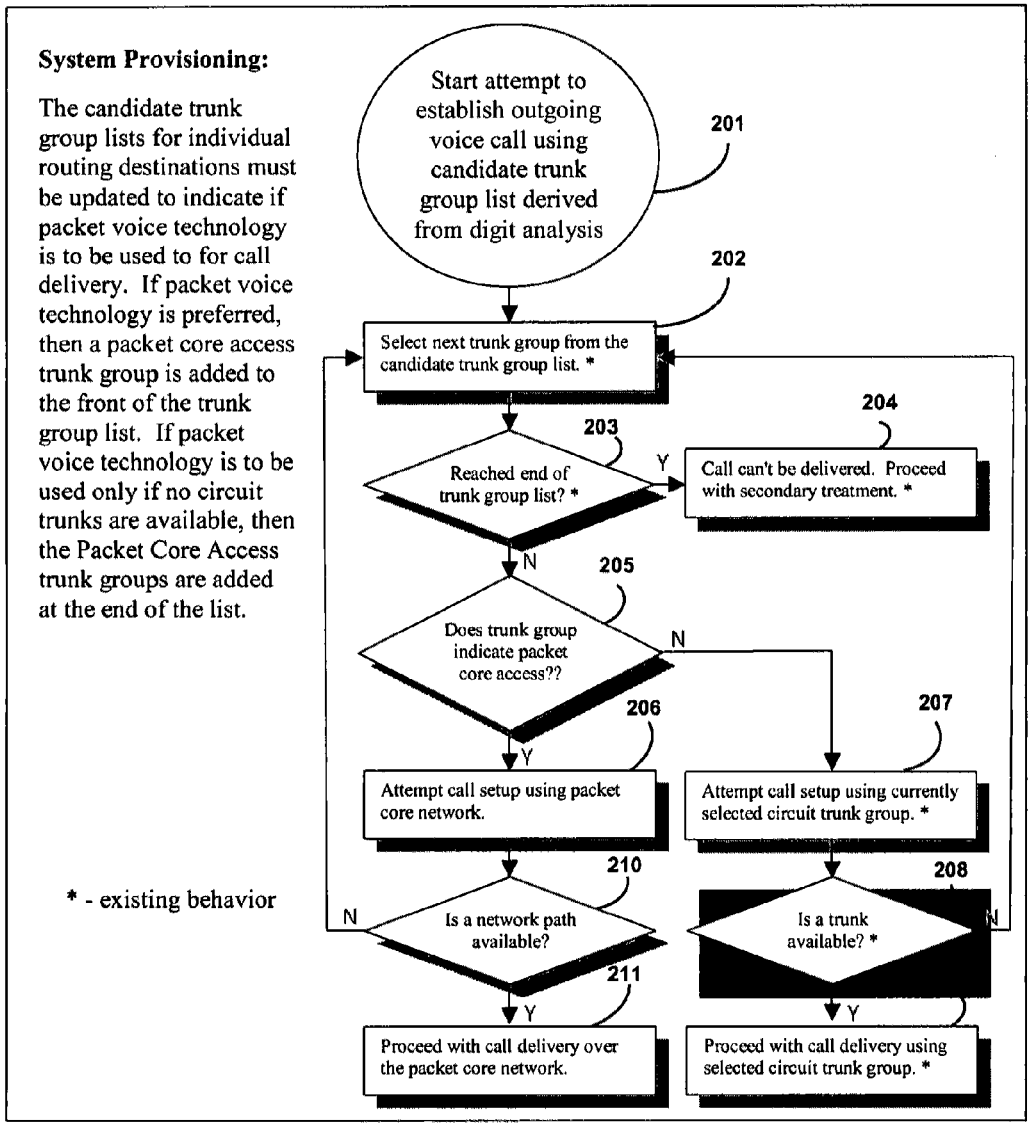
FIG. 2 depicts an algorithm used to select packet voice routing according to the present method.

FIG. 2 depicts an algorithm used to select packet voice routing according to the present method. Regarding system provisioning, the candidate trunk group lists for individual routing destinations must be updated to indicate if packet voice technology is to be used to for call delivery. If packet voice technology is preferred, then a packet core access trunk group is added to the front of the trunk group list. If packet voice technology is to be used only if no circuit trunks are available, then the packet core access trunk groups are added at the end of the list.

One embodiment of an algorithm used to select packet voice routing according to the present method may have the following steps: start attempt to establish outgoing voice call using candidate trunk group list derived from digit analysis (201); select next trunk group from the candidate trunk group list (existing behavior) (202); reached end of trunk group list? (existing behavior) (203); if the end is reached, call can't be delivered, and proceed with secondary treatment (existing behavior) (204); if the end is not reached, does trunk group indicate packet core access? (205) if trunk group does not indicate packet core access, attempt call setup using currently selected circuit trunk group (existing behavior) (207); is a trunk available? (existing behavior) (208); if trunk not available, return to select next trunk group from the candidate trunk group list (existing behavior) (202); if trunk is available, proceed with call delivery using selected circuit trunk group (existing behavior) (209); if trunk group does indicate packet core access, attempt call setup using packet core network (206); is a network path available? (210); if network path is unavailable, return to select next trunk group from the candidate trunk group list (existing behavior) (202); and if network path is available, proceed with call delivery over the packet core network (211).

Figure 3:
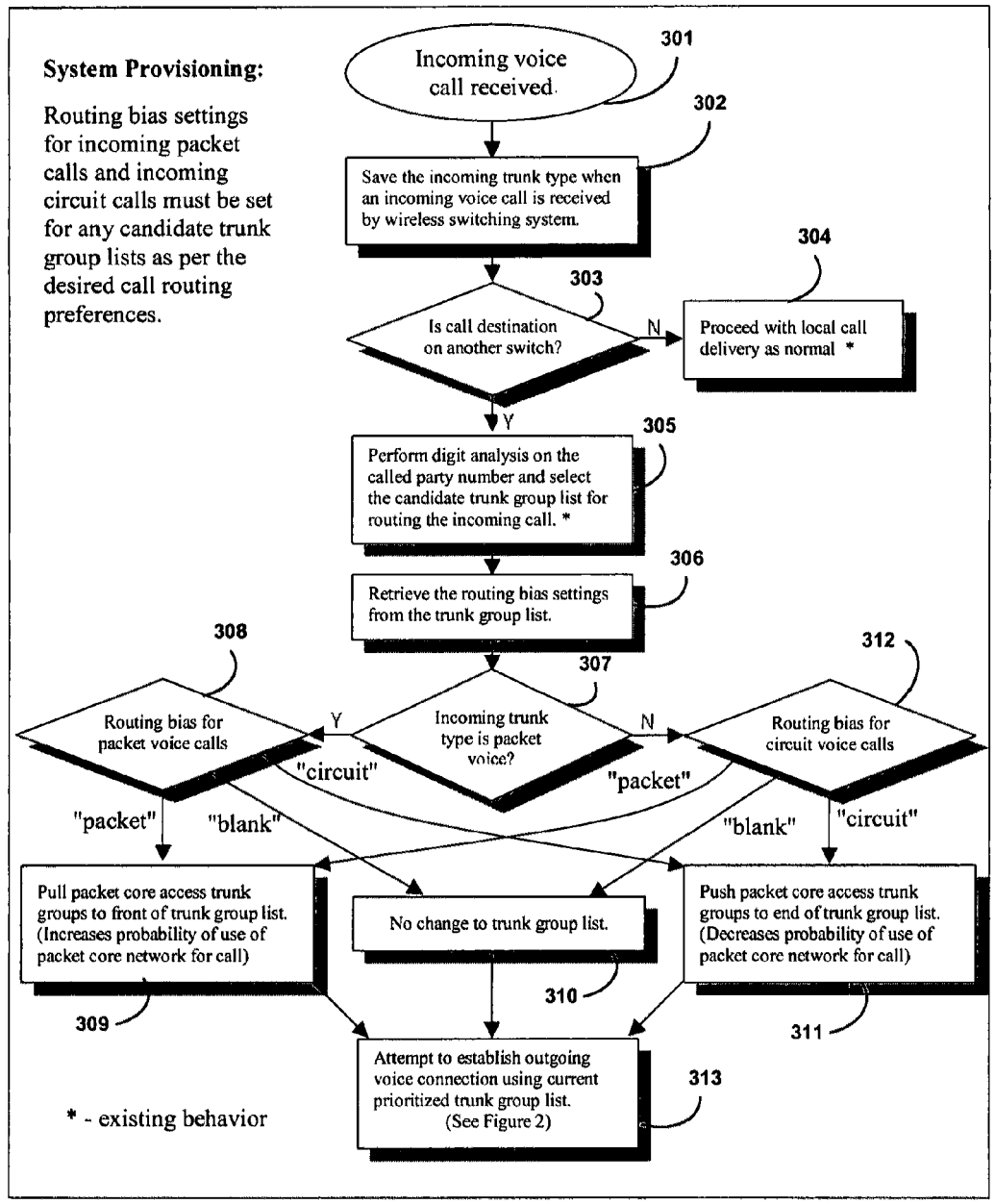
FIG. 3 depicts an algorithm used to implement incoming voice call routing preference according to the present method.

FIG. 3 depicts an algorithm used to implement incoming voice call routing preference according to the present method and apparatus. Regarding system provisioning, routing bias settings for incoming packet calls and incoming circuit calls must be set for any candidate trunk group lists as per the desired call routing preferences.

One embodiment of an algorithm used to implement incoming voice call routing preference according to the present method may have the following steps: incoming voice call received (301); save the incoming trunk type when an incoming voice call is received by wireless switching system (302); is call destination on another switch? (303); if the call destination is not on another switch, proceed with local call delivery as normal (existing behavior) (304); if the call destination is on another switch, perform digit analysis on the called party number and select the candidate trunk group list for routing the incoming call (existing behavior) (305); retrieve the routing bias settings from the trunk group list (306); incoming trunk type is packet voice? (307); if incoming trunk type is packet voice, check routing bias for packet voice calls (308); if routing bias for packet voice calls is "packet", pull packet core access trunk groups to front of trunk group list (increases probability of use of packet core network for call) (309); if routing bias for packet voice calls is "blank", no change to trunk group list (310); if routing bias for packet voice calls is "circuit", push packet core access trunk groups to end of trunk group list (decreases probability of use of packet core network for call) (311); if incoming trunk type is not packet voice, check routing bias for circuit voice calls (312); if routing bias for circuit voice calls is "packet", pull packet core access trunk groups to front of trunk group list (increases probability of use of packet core network for call) (309); if routing bias for packet voice calls is "blank", no change to trunk group list (310); if routing bias for packet voice calls is "circuit", push packet core access trunk groups to end of trunk group list (decreases probability of use of packet core network for call) (311); then from steps 309, 310, 311, attempt to establish outgoing voice connection using current prioritized trunk group list (313).

The present apparatus in one example may comprise a plurality of components such as one or more of electronic components, hardware components, and computer software components. A number of such components may be combined or divided in the apparatus.

The present apparatus in one example may employ one or more computer-readable signal-bearing media. The computer-readable signal-bearing media may store software, firmware and/or assembly language for performing one or more portions of one or more embodiments. The computer-readable signal-bearing medium for the apparatus in one example may comprise one or more of a magnetic, electrical, optical, biological, and atomic data storage medium. For example, the computer-readable signal-bearing medium may comprise floppy disks, magnetic tapes, CD-ROMs, DVD-ROMs, hard disk drives, and electronic memory. In another example, the computer-readable signal-bearing medium may comprise a modulated carrier signal transmitted over a network comprising or coupled with the apparatus, for instance, one or more of a telephone network, a local area network ("LAN"), a wide area network ("WAN"), the Internet, and a wireless network.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

I claim:

1. A method for routing calls in a cellular telecommunication system having at least one mobile switching center (MSC) using a routing table database to route calls over standard circuit trunks, comprising:
    adding packet core access trunks to the routing table database, wherein the packet core access trunks represent voice bearer paths through a packet core network;
    receiving a call for a called party number;
    performing digit analysis on the called party number and obtaining a list of candidate trunk groups from the routing table database, the list potentially including both circuit trunks and packet core access trunks;
    if the call is from another MSC:
        checking the trunk type of the call and checking to see if a routing bias for packet trunks or circuit trunks has been specified;
        if the routing bias is 'packet' and the list of candidate trunk groups includes packet core access trunks, pulling the packet core access trunks to the front of the candidate trunk group list and attempting to establish outgoing voice connection using the prioritized candidate trunk group list;
        if the routing bias is 'circuit' and the list of candidate trunk groups includes packet core access trunks, pushing the packet core access trunks to the end of the candidate trunk group list and attempting to establish outgoing voice connection using the prioritized candidate trunk group list; and
        if the routing bias is 'blank', attempting to establish outgoing voice connection using the obtained candidate trunk group list;
    if the call is from an originating mobile terminal:
        checking to see if the candidate trunk group list includes at least one packet core access trunk, and if so, performing special processing for packet voice support by checking to see if the call is compatible with packet core network and if system resources are available, if so, routing the call as a packet voice call, otherwise, removing the packet core access trunks from the list and routing the call using circuit trunks.

2. The method according to claim 1, wherein the steps performed when the call is from an originating mobile terminal further comprise:
    starting attempt to establish outgoing voice call using candidate trunk group list derived from digit analysis;
    selecting next trunk group from the candidate trunk group list;
    check if end of trunk group list has been reached;
    if the end is reached, call can't be delivered, and proceeding with secondary treatment;
    if the end is not reached, checking if trunk group indicates packet core access;
    if trunk group does not indicate packet core access, attempting call setup using currently selected circuit trunk group;
    checking if a trunk is available;
    if trunk not available, returning to select next trunk group from the candidate trunk group list;
    if trunk is available, proceeding with call delivery using selected circuit trunk group;
    if trunk group does indicate packet core access, attempting call setup using packet core network;
    checking if a network path is available;
    if network path is unavailable, returning to select next trunk group from the candidate trunk group list; and
    if network path is available, proceeding with call delivery over the packet core network.

3. The method according to claim 1, wherein the steps performed when the call is from another MSC further comprise: retrieving the routing bias settings from the trunk group list;
    checking if incoming trunk type is packet voice;
    if incoming trunk type is packet voice, checking the routing bias for packet voice calls;
        if routing bias for packet voice calls is "packet", pulling packet core access trunk groups to front of trunk group list, and attempting to establish outgoing voice connection using current prioritized trunk group list;
        if routing bias for packet voice calls is "blank", no change to trunk group list, and attempting to establish outgoing voice connection using current prioritized trunk group list;
        if routing bias for packet voice calls is "circuit", pushing packet core access trunk groups to end of trunk group list, and attempting to establish outgoing voice connection using current prioritized trunk group list;
    if incoming trunk type is not packet voice, checking the routing bias for circuit voice calls;
        if routing bias for packet voice calls is "packet", pulling packet core access trunk groups to front of trunk group list, and attempting to establish outgoing voice connection using current prioritized trunk group list;
        if routing bias for packet voice calls is "blank", no change to trunk group list, and attempting to establish outgoing voice connection using current prioritized trunk group list; and
        if routing bias for packet voice calls is "circuit", pushing packet core access trunk groups to end of trunk group list, and attempting to establish outgoing voice connection using current prioritized trunk group list.

4. The method according to claim 1, wherein, for incoming calls that are routed to another destination, if an incoming call is initially designated for packet routing, then the routing of the call is always packet routing in the telecommunication system, and if an incoming call is initially designated for non-packet routing, then the routing of the call is always non-packet routing in the telecommunication system.

5. The method according to claim 1, wherein the special processing for packet voice support further comprises:
    checking if a current call instance of the call is compatible with routing over a packet core network;
    checking, if the current call instance of the call is compatible with routing over a packet core network, if system resources for routing a call over the packet core network are currently available; and
    proceeding, if both of these checks pass, with the call as a packet voice call.

6. A mobile switching center (MSC) for use in a cellular system infrastructure that supports both circuit switching and packet-based routing, comprising:
    controller operatively coupled to a first plurality of cells;
    first interface operatively coupled to two or more circuit trunk groups, at least one of said circuit trunk groups operatively coupled to a second MSC which is operatively coupled to a second plurality of cells, and at least a second one of said circuit trunk groups operatively coupled to a public switched telephone network (PSTN);
    second interface operatively coupled to one or more packet core access trunk groups, said packet core access trunk groups operatively coupled to a packet core network;

memory for storing a routing table database, said routing table database having entries representing circuit trunk groups and entries for packet core access trunk groups; and processor for accessing said memory to retrieve a list of candidate trunk groups and for routing call traffic in accordance with an incoming voice call routing bias by:
checking the trunk type of the call and checking to see if a routing bias for packet trunks or circuit trunks has been specified;
if the routing bias is 'packet' and the list of candidate trunk groups includes packet core access trunks pulling the packet core access trunks to the front of the candidate trunk group list and attempting to establish outgoing voice connection using the prioritized candidate trunk group list;
if the routing bias is 'circuit' and the list of candidate trunk groups includes packet core access trunks, pushing the packet core access trunks to the end of the candidate trunk group list and attempting to establish outgoing voice connection using the prioritized candidate trunk group list; and
if the routing bias is 'blank', attempting to establish outgoing voice connection using the candidate trunk group list.

7. The mobile switching center according to claim 6, wherein, for incoming calls that are routed to another destination, if an incoming call is initially designated for packet routing, then the routing of the call is always packet routing in the telecommunication system, and if an incoming call is initially designated for circuit routing, then the routing of the call is always circuit routing in the telecommunication system.

8. The mobile switching center according to claim 6, wherein the processor, when an attempt to originate a call for a called party number is made, performs digit analysis on the called party number and performs special processing for packet voice support by:
checking if a current call instance of the call is compatible with routing over a packet core network;
checking, if the current call instance of the call is compatible with routing over a packet core network, if system resources for routing a call over the packet core network are currently available; and
proceeding, if both of these checks pass, with the call as a packet voice call, and, if either of these checks fail, then removing the at least one packet core access trunk from the candidate trunk group list and routing the call using circuit trunks.

9. The mobile switching center according to claim 6, wherein the processor, when an incoming call, for a called party number, to a switch is to be routed to another destination, performs digit analysis on the called party number and performs special processing for packet voice support by,
if the incoming call is a packet voice call and a preference for packet voice calls to be routed to next destination as a packet voice call is indicated, then all packet core access trunks in the candidate trunk group list are moved to a front of the list, and if the incoming call is a circuit voice call and a preference for circuit voice calls to be routed to a next destination as a circuit voice call is indicated, then all packet core access trunks in the candidate trunk group list are moved to a end of the list.

10. A method for implementing an incoming voice call routing preference in a telecommunication system comprising:
setting routing bias settings for incoming packet calls and incoming circuit calls for any candidate trunk group lists as per desired call routing preferences;
selecting one of packet routing and a non-packet routing for call routing, the candidate trunk group lists for individual routing destinations being updated to indicate if packet voice technology is to be used for call delivery, wherein if packet voice technology is preferred, then a packet core access trunk group is added to a front of a respective trunk group list, and wherein if packet voice technology is to be used only if no circuit trunks are available, then packet core access trunk groups are added at an end of the list;
starting attempt to establish outgoing voice call using candidate trunk group list derived from digit analysis;
selecting next trunk group from the candidate trunk group list;
check if end of trunk group list has been reached;
if the end is reached, call can't be delivered, and proceeding with secondary treatment;
if the end is not reached, checking if trunk group indicates packet core access;
if trunk group does not indicate packet core access, attempting call setup using currently selected circuit trunk group;
checking if a trunk is available;
if trunk not available, returning to select next trunk group from the candidate trunk group list;
if trunk is available, proceeding with call delivery using selected circuit trunk group;
if trunk group does indicate packet core access, attempting call setup using packet core network;
checking if a network path is available;
if network path is unavailable, returning to select next trunk group from the candidate trunk group list; and
if network path is available, proceeding with call delivery over the packet core network.

11. The method according to claim 10, wherein, for incoming calls that are routed to another destination, if an incoming call is initially designated for packet routing, then the routing of the call is always packet routing in the telecommunication system, and if an incoming call is initially designated for non-packet routing, then the routing of the call is always non-packet routing in the telecommunication system.

12. The method according to claim 10, wherein the method further comprises:
performing, when an attempt to originate a call for a called party number is made, digit analysis on the called party number and obtaining a list of candidate trunk groups from routing tables;
performing, if the candidate trunk group list includes at least one packet core access trunk, special processing for packet voice support;
checking if a current call instance of the call is compatible with routing over a packet core network;
checking, if the current call instance of the call is compatible with routing over a packet core network, if system resources for routing a call over the packet core network are currently available; and
proceeding, if both of these checks pass, with the call as a packet voice call, and, if either of these checks fail, then removing the at least one packet core access trunk from the candidate trunk group list and routing the call using circuit trunks.

13. The method according to claim 10, wherein the method further comprises:
performing, when an incoming call, for a called party number, to a switch is to be routed to another destination, digit analysis on the called party number and obtaining a list of candidate trunk groups from routing tables;

performing, if the candidate trunk group list includes at least one packet core access trunk, special processing for packet voice support;

the special processing being, if the incoming call is a packet voice call and a preference for packet voice calls to be routed to next destination as a packet voice call is indicated, then all packet core access trunks in the candidate trunk group list are moved to a front of the list, and if the incoming call is a circuit voice call and a preference for circuit voice calls to be routed to a next destination as a circuit voice call is indicated, then all packet core access trunks in the candidate trunk group list are moved to a end of the list.

14. The method according to claim 10, wherein the method is an adaptive routing mechanism for routing calls in the telecommunication system.

\* \* \* \* \*